US009984228B2

(12) United States Patent
Childress et al.

(10) Patent No.: US 9,984,228 B2
(45) Date of Patent: May 29, 2018

(54) PASSWORD RE-USAGE IDENTIFICATION BASED ON INPUT METHOD EDITOR ANALYSIS

(71) Applicant: International Business Machines Corporation, Armonk, NY (US)

(72) Inventors: Rhonda L. Childress, Austin, TX (US); Itzhack Goldberg, Hadera (IL); David B. Kumhyr, Austin, TX (US); Su Liu, Austin, TX (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 14/973,583

(22) Filed: Dec. 17, 2015

(65) Prior Publication Data

US 2017/0180129 A1 Jun. 22, 2017

(51) Int. Cl.

*G06F 21/46* (2013.01)
*H04L 9/32* (2006.01)
*G06F 3/023* (2006.01)

(52) U.S. Cl.

CPC ............ *G06F 21/46* (2013.01); *G06F 3/0237* (2013.01); *H04L 9/3226* (2013.01); *H04L 9/3234* (2013.01); *H04L 9/3236* (2013.01); *G06F 2221/2131* (2013.01)

(58) Field of Classification Search

CPC . G06F 21/46; G06F 2221/2131; G06F 3/0237
See application file for complete search history.

(56) References Cited

U.S. PATENT DOCUMENTS 5,394,471 A 2/1995 Ganesan et al.
7,443,316 B2 * 10/2008 Lim ...................... G06F 3/0237 341/22
7,523,486 B1 * 4/2009 Turner .................. G06F 21/604 707/999.009

(Continued)

FOREIGN PATENT DOCUMENTS

WO 2015076835 5/2015

OTHER PUBLICATIONS

Das, A., Bonneau, J., Caesar, M., Borisov, N. and Wang, X., Feb. 2014, The Tangled Web of Password Reuse. In NDSS (vol. 14, pp. 23-26). (Year: 2014).*

(Continued)

*Primary Examiner* — James R Turchen
(74) *Attorney, Agent, or Firm* — VanLeeuwen & VanLeeuwen; Steven L. Bennett

(57) ABSTRACT

An approach is provided for password re-usage identification based on an Input Method Editor (IME) analysis. The approach analyzes a number of keystrokes received from a user at the IME that is running on the information handling system. A set of keystrokes received at the IME are identified as a possible new password that is being established by the user. A set of existing password data is searched with the search being based on the possible new password. The set of existing passwords are stored in a data store accessible from at least one of the processors of the information handling system. In response to the searching identifying that one of the existing passwords matches the possible new password, a notification, or warning, is displayed to the user.

14 Claims, 5 Drawing Sheets

(56) References Cited

U.S. PATENT DOCUMENTS 8,332,650 B2 * 12/2012 Banes ..................... G06F 21/34 713/182
8,332,918 B2 * 12/2012 Vedula .................... G06F 21/46 713/182
8,539,247 B2 9/2013 McGrew et al.
8,769,607 B1 7/2014 Jerdonek et al.
8,832,804 B1 9/2014 Casey et al.
8,918,836 B2 * 12/2014 Schechter ............... G06F 21/46 713/183
8,973,116 B2 3/2015 Wheeler
9,634,999 B1 * 4/2017 Marion ............... H04L 63/0838
2007/0006301 A1 * 1/2007 Nickell ................... G06F 21/46 726/22
2008/0307235 A1 * 12/2008 Keohane ................. G06F 21/46 713/183
2009/0150971 A1 * 6/2009 Vedula .................... G06F 21/31 726/1
2010/0042847 A1 * 2/2010 Jung ....................... G06F 21/43 713/183
2010/0114560 A1 5/2010 Spataro
2011/0239267 A1 * 9/2011 Lyne ....................... G06F 21/46 726/1
2012/0110668 A1 * 5/2012 Schechter ............... G06F 21/00 726/25
2012/0304302 A1 * 11/2012 Stecher ................... G06F 21/31 726/26
2013/0263263 A1 * 10/2013 Narkolayev ............ G06F 21/51 726/22
2013/0283337 A1 * 10/2013 Schechter ............... G06F 21/46 726/1
2014/0331060 A1 * 11/2014 Hayton ................... G06F 21/31 713/186
2015/0254452 A1 * 9/2015 Kohlenberg .......... H04L 63/083 726/6

OTHER PUBLICATIONS

Anonymous, “Method and System for Credential Classification and Reuse within IT Systems,” IP.com, No. 300206811, May 9, 2011, 5 pages.

“Trusteer Endpoint Protection has identified password submission,” International Business Machines Corporation, accessed Apr. 2015, 2 pages.

“Enterprise Password Policy and Compliance,” International Business Machines Corporation, accessed Apr. 2015, 2 pages.

“OnePoll Shows Americans Reuse Banking Password,” Identity Crime Prevention Institute, Nov. 2014, 2 pages.

* cited by examiner

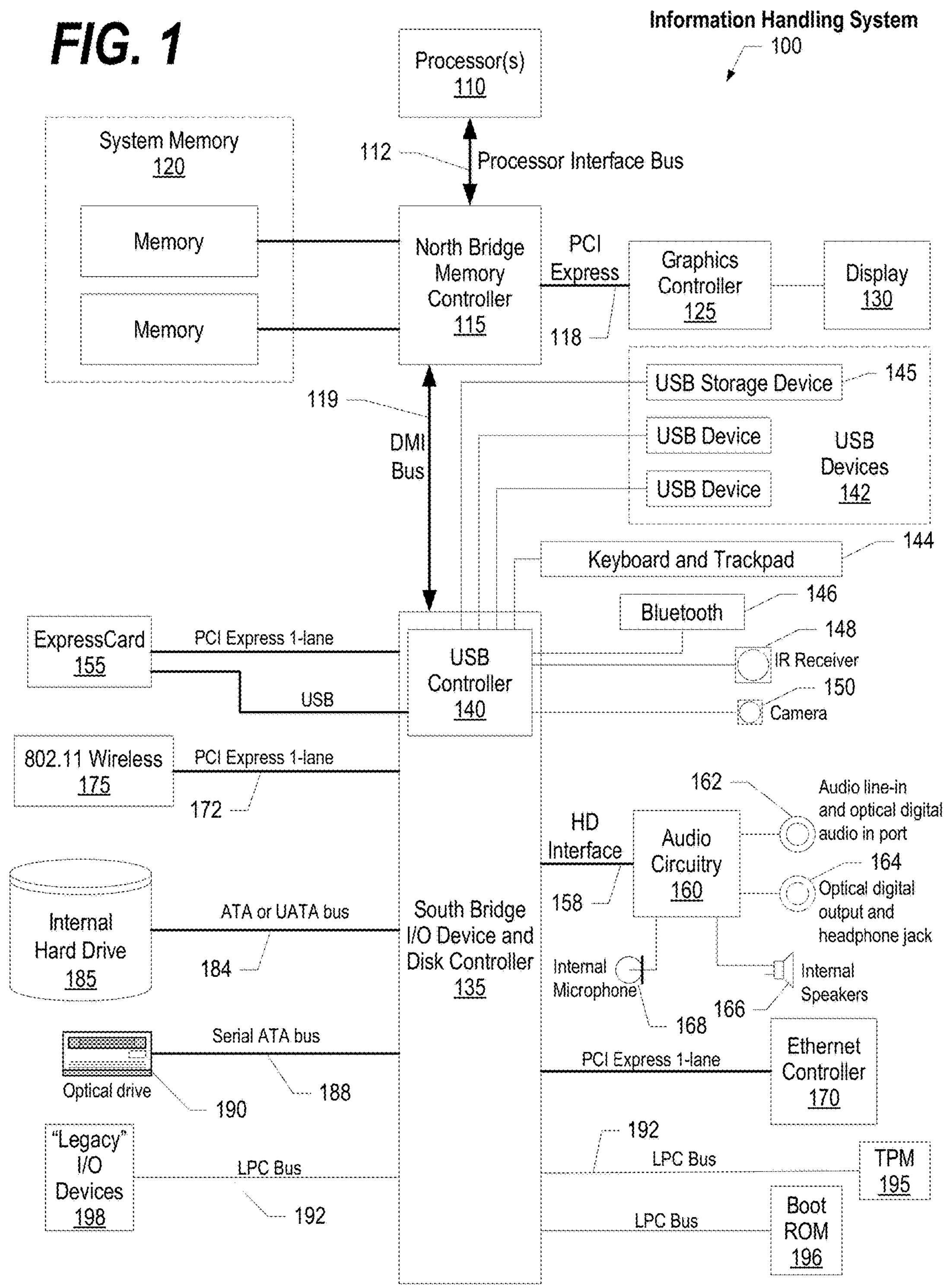
FIG. 1
Information Handling System
100
Processor(s)
110
112
Processor Interface Bus
System Memory
120
Memory
Memory
North Bridge
Memory
Controller
115
PCI
Express
118
Graphics
Controller
125
Display
130
USB Storage Device
145
USB Device
USB Device
USB
Devices
142
119
DMI
Bus
Keyboard and Trackpad
144
Bluetooth
146
148
IR Receiver
150
Camera
ExpressCard
155
PCI Express 1-lane
USB
USB
Controller
140
802.11 Wireless
175
PCI Express 1-lane
172
162
Audio line-in
and optical digital
audio in port
HD
Interface
Audio
Circuitry
160
164
Optical digital
output and
headphone jack
158
Internal
Hard Drive
185
ATA or UATA bus
184
South Bridge
I/O Device and
Disk Controller
135
Internal
Microphone
Internal
Speakers
166
168
Optical drive
Serial ATA bus
188
190
PCI Express 1-lane
Ethernet
Controller
170
192
LPC Bus
TPM
195
"Legacy"
I/O
Devices
198
LPC Bus
192
LPC Bus
Boot
ROM
196

PASSWORD RE-USAGE IDENTIFICATION BASED ON INPUT METHOD EDITOR ANALYSIS

BACKGROUND OF THE INVENTION

Technical Field

This disclosure relates to alerting users to re-usage of a common password for multiple systems.

Description of Related Art

Annual cyber crime cost to the global economy is hundreds of billions of dollars, including both the gains to criminals and the costs to companies for recovery and defense. Popular social networks, web mail and online banking are frequently targeted by cyber-criminals. Login credentials and sensitive information is harvested through malware, phishing or server-side attacks. Users, such as employees, are often resistant to remember multiple passwords, and such resistance might cause these users to use their passwords, such as their corporate login passwords, on other sites, placing sensitive business data at risk. Organizations must ensure that employees and other users of enterprise applications do not reuse their credentials for non-enterprise apps. One of the most prevalent security rules is to restrict the usage of a given password to one account only so, that if that password is compromised, the thief is not in possession of passwords to corporate systems and other sites on which the user's has an account.

SUMMARY

An approach is provided for password re-usage identification based on an Input Method Editor (IME) analysis. The approach analyzes a number of keystrokes received from a user at the IME that is running on the information handling system. A set of keystrokes received at the IME are identified as a possible new password that is being established by the user. A set of existing password data is searched with the search being based on the possible new password. The set of existing passwords are stored in a data store accessible from at least one of the processors of the information handling system. In response to the searching identifying that one of the existing passwords matches the possible new password, a notification, or warning, is displayed to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 1 depicts a block diagram of a processor and components of an information handling system;

DETAILED DESCRIPTION

Figure 2:
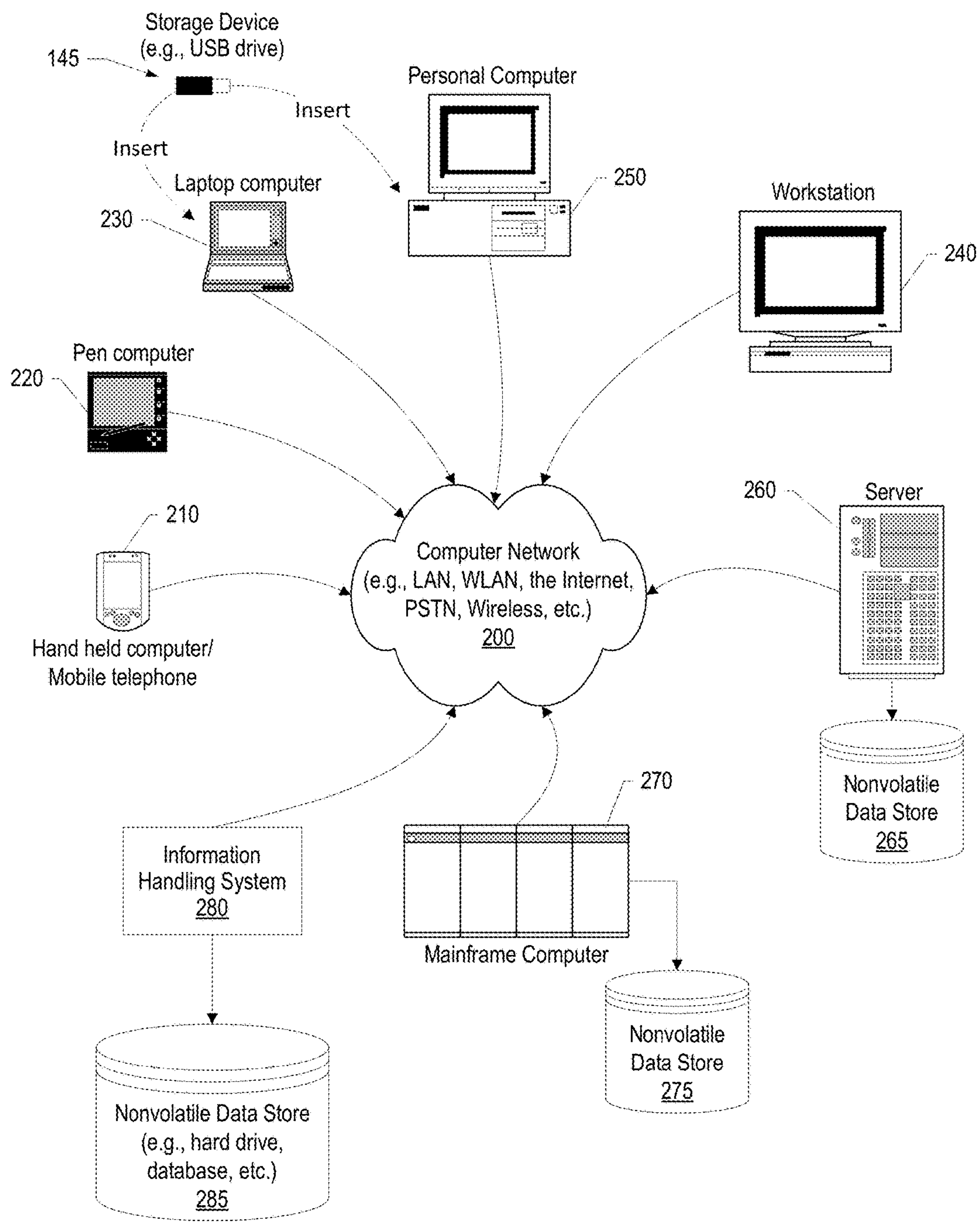
FIG. 2 is a network environment that includes various types of information handling systems interconnected via a computer network.

FIGS. 1-5 show an approach for password revalidation on a kernel level based on an input method editor analytics. The approach includes predefined password policy and rules, an input password analytics daemon, an input phrase hash table (hashed so that outsiders cannot view table of passwords), and a password revalidation agent. The input password analytics daemon detects possible password phrases and hashes them as input phrases to a hash table with related stamps (e.g., application identifier, updated dates, etc.). The password revalidation agent checks for new password input phrases in input method editor. If the agent detects that any input pair of phrases sequences are the same as a hashed possible password phrases, then a re-usage identification alert is triggered. Note that no one will know what the suspected password is/was because the approach advises the user that the password is a repeat without revealing the password that was entered by the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
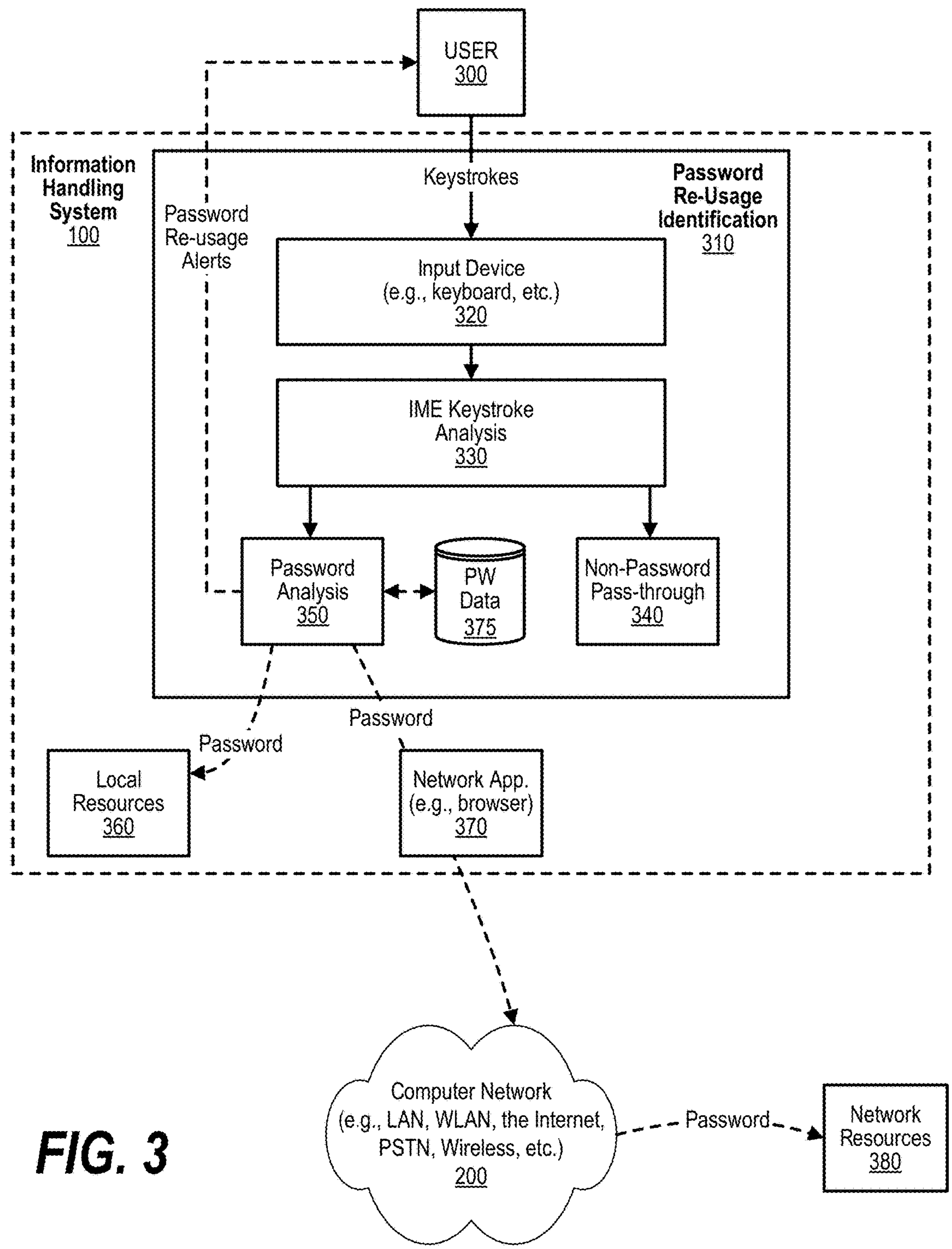
FIG. 3 is a high level diagram depicting components and processes in an exemplary environment that identifies password re-usage based on an Input Method Editor (IME) analysis.

FIG. 3 is a high level diagram depicting components and processes in an exemplary environment that identifies password re-usage based on an Input Method Editor (IME) analysis. User 300 is utilizing an information handling system, such as any of the devices shown in FIG. 2. An input method (or input method editor, commonly abbreviated IME) is an operating system component that allows any data, such as keyboard strokes or mouse movements, to be received as input. In this way users can enter characters and symbols not found on their input devices. Because the IME is already in place in the operating system to receive and process keystrokes received by the user, the approach described herein provides a "hook" at a low level of the operating system, such as the kernel level, that analyzes keystrokes entered that are possible new password entries.

Password re-usage identification process 310 utilizes the IME to process keystroke data received at the device, such as from input device 320 (e.g., a keyboard, mouse, etc. available for providing input to the information handling system). IME keystroke analysis 330 is the process that analyzes the keystrokes received at the IME for possible new password entries. Data that is not deemed password-type data passes through to the application being used by the user (e.g., web browser, word processor, etc.) at 340.

However, keystroke data that is analyzed and determined to be possible password data is intercepted by password analysis process 350. In one embodiment, the password is allowed to be transmitted to the resource targeted by the user (e.g., local resources 360 such as a word processor running on the information handling system and network resources 370, via a browser application, that transmits the password over computer network 200 to network resource 380 such as a website that requires a password, etc.). If password analysis 350 identifies that a password is being established for a resource and that the password has already been used for a resource, then the routine alerts the user of the possible password re-usage. In one embodiment, the password analysis routine allows the user to abort entry of the new password to the resource.

Password analysis 350 compares possible new passwords to previously used password data that is stored in data store 375. In one embodiment, the previously used password data are hashes of the passwords rather than the actual passwords in order to protect the passwords from possibly being retrieved and exploited by malevolent users. When a new password is entered by the user, the password data (e.g., a hash of the password, etc.) is added to password data store 375 (e.g., a hash table of hashes of previously used passwords, etc.).

Figure 4:
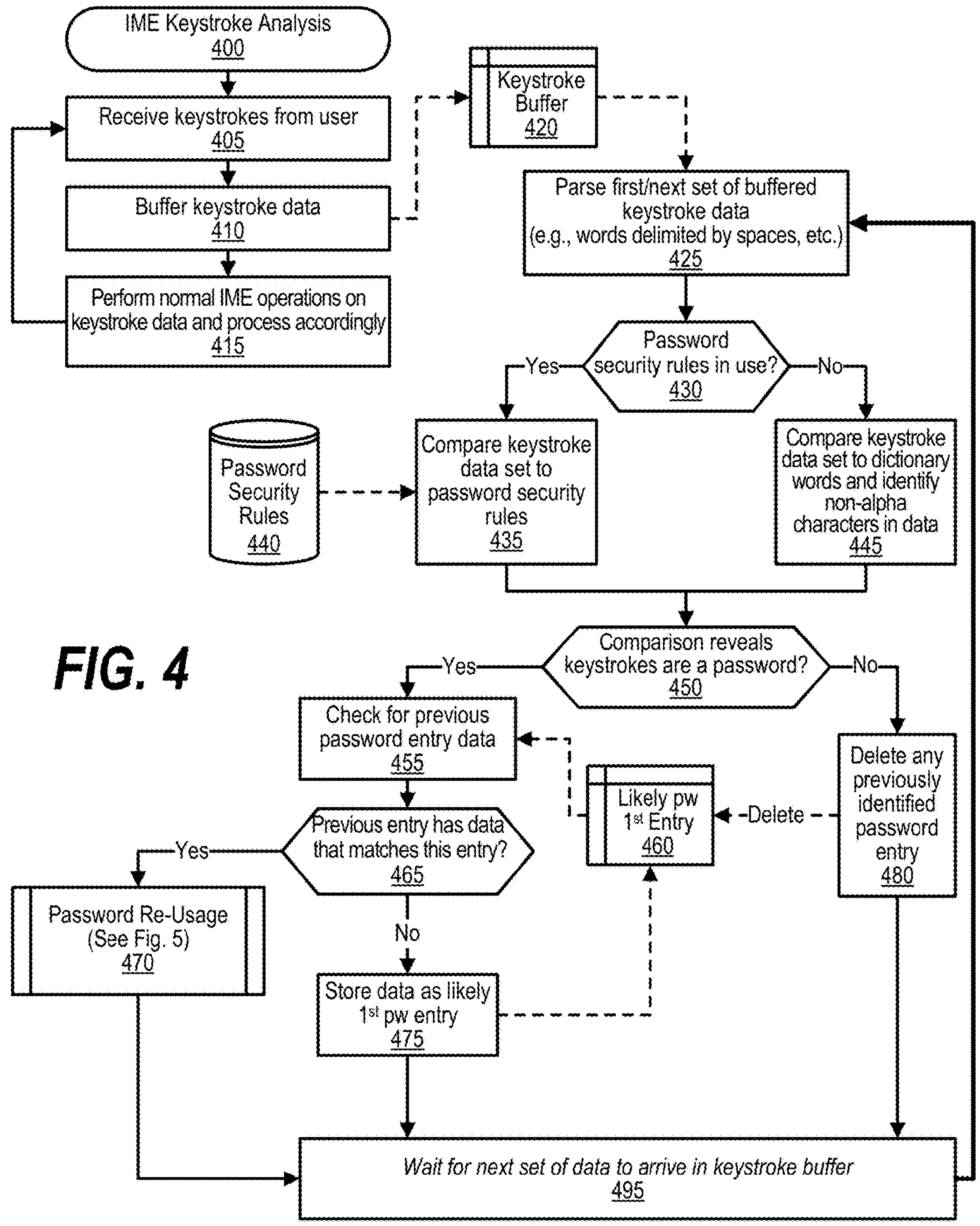
FIG. 4 is a flowchart showing steps performed by a process that analyzes keystrokes received at a device.

FIG. 4 is a flowchart showing steps performed by a process that analyzes keystrokes received at a device. FIG. 4 processing commences at 400 and shows the steps taken by a process that performs the Input Method Editor (IME) Keystroke Analysis. At step 405, the process receives keystrokes from user. At step 410, the process buffers keystroke data to memory area 420. At step 415, the process performs normal IME operations on keystroke data and processes the data accordingly. Processing then loops back to receive further keystroke data from the user. This looping repeats while the information handling system is being used by the user.

The analysis routine, from step 425 through step 495, are performed in parallel with the keystroke input steps shown in steps 405 through 415. When keystroke data is buffered to buffer 420 then, at step 425, the process parses the first set of buffered keystroke data (e.g., words delimited by spaces, etc.). The process determines as to whether password security rules are currently in use on the information handling system (decision 430). Password security rules are often used by an organization to define minimum password security, such as the number of characters in the password, use of upper and lowercase characters, use of numeric characters, and use of special characters in passwords. If password security rules are currently in use on the information handling system, then decision 430 branches to the 'yes' branch whereupon, at step the process compares keystroke data set to password security rules that are retrieved from data store 440.

On the other hand, if password security rules are not currently in use on the information handling system, then decision 430 branches to the 'no' branch whereupon, at step 445, the process compares keystroke data set to dictionary words and identifies non-alpha and special characters in the set of data that might indicate a password. in one embodiment, a possible password is identified if the set of keystroke data is not found in a dictionary of words. In a further embodiment, the possible password is identified if the keystroke data is not found in a dictionary of words and the keystroke data includes at least one numeric or special character.

The process determines as to whether comparison performed at either steps 435 or 445 revealed that the set of keystroke data are a password (decision 450). If the comparison reveals that the set of keystroke data are a possible password, then decision 450 branches to the 'yes' branch to perform steps 455 through 475. On the other hand, if the comparison reveals that the set of keystroke data are not a possible password, then decision 450 branches to the 'no' branch whereupon, at step 480, the process deletes any previously identified password entry that may have been stored in memory area 460 by a previous execution of the routine.

If the comparison reveals that the set of keystroke data are a possible password, then decision 450 branches to the 'yes' branch to perform steps 455 through 475. At step 455, the process checks for previous password entry data in memory area 460. A possible new password is identified when the user enters the same set of characters twice in a row which is the standard approach of new password entry that is used to control resources by having the user enter the new password and then having the user re-enter the new password. The process next determines whether the previous password entry from memory area 460 matches this entry (decision 465). If the previous password entry matches this entry (signifying entry of a new password for a resource), then decision 465 branches to the 'yes' branch to perform predefined process 470. On the other hand, if the previous password entry does not match this entry, then decision 465 branches to the 'no' branch, whereupon at step 475, the process stores the new password entry as a likely first password entry. If the password entry is only being used to access a resource and is not being changed, then the next set of keystroke data will not match the stored password and this data will be deleted or overwritten during a subsequent execution of this routine.

Figure 5:
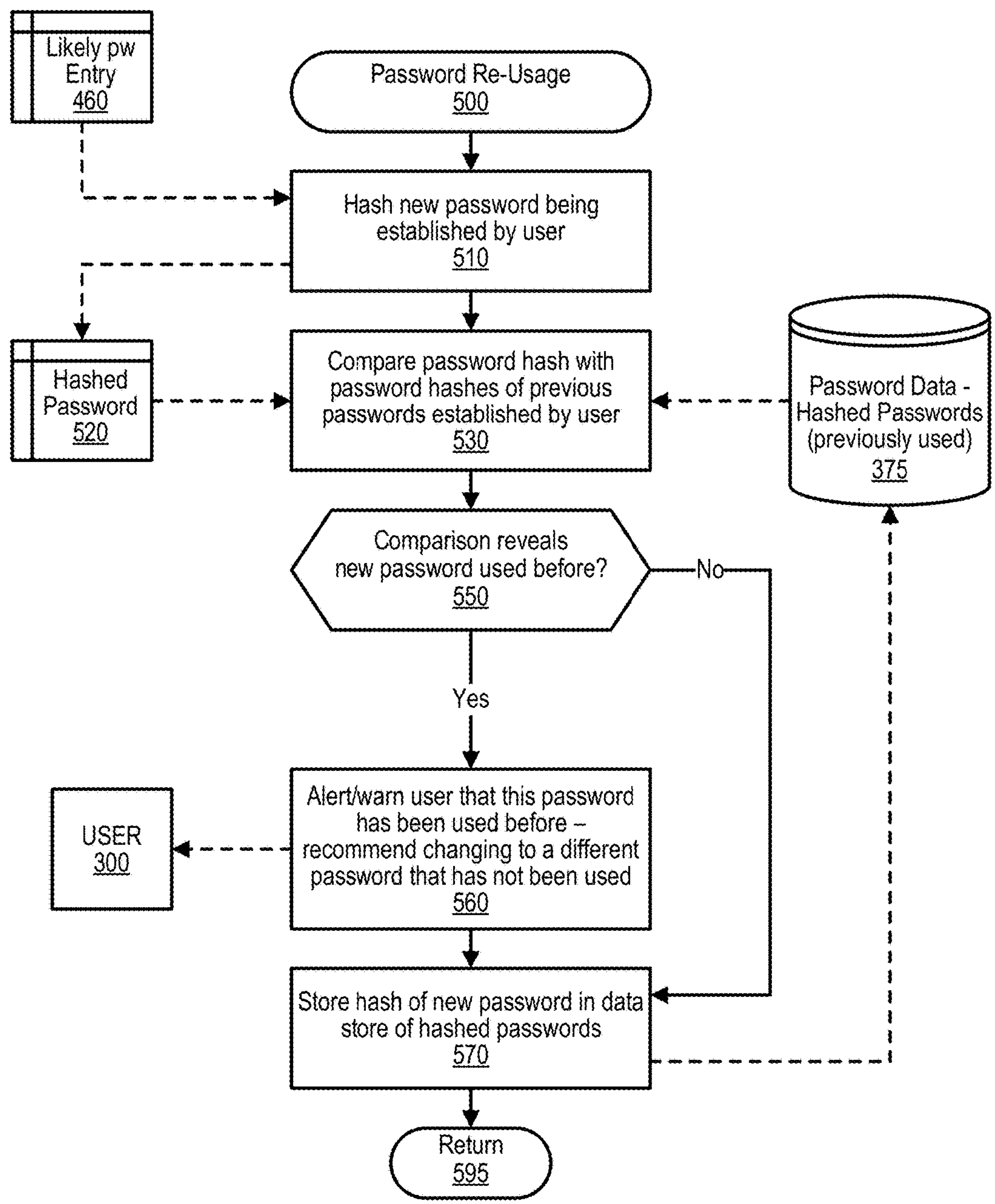
FIG. 5 is a flowchart showing steps taken to check for password re-usage when the process detects establishment of a new password at the device.

At predefined process 470, the process performs the Password Re-Usage routine (see FIG. 5 and corresponding text for processing details). At step 495, the process waits for the next set of keystroke data to arrive in keystroke buffer. Processing then loops back to receive the next set of keystroke data from buffer 420. This looping repeats while the information handling system is being used by the user.

FIG. 5 is a flowchart showing steps taken to check for password re-usage when the process detects establishment of a new password at the device. FIG. 5 processing commences at 500 and shows the steps taken by a process that performs the password re-usage routine. At step 510, the process hashes the possible new password that is being established by user to control access to a resource. The possible new password data is retrieved from memory area 460 and the result of the computed hash on the possible new password data is stored in memory area 520.

At step 530, the process compares the computed password hash with password hashes of previous passwords established by user. The computed hash of the password is retrieved from memory area 520 and the hashes of previously established passwords are retrieved from data store 375. Hashes of passwords are retained in data store 375 rather than the actual passwords so that the actual passwords cannot be obtained by a malicious user that gains access to the information handling system.

The process determines as to whether the comparison at step 530 reveals that the possible new password has already been used before to control another resource (decision 550). If the possible new password has already been used before, then decision 550 branches to the 'yes' branch whereupon, at step 560, the process notifies user 300 (e.g., with an alert, warning, etc.) that this password has already been used before and the process recommends that the user uses a different password that has not yet been used. The notification is performed without displaying the possible new password on the display device.

On the other hand, if the possible new password has not been used before, then decision 550 branches to the 'no' branch bypassing step 560. At step 570, the process stores the computed hash of the possible new password in data store 375 which is a hash table of previously used passwords by the user. FIG. 5 processing thereafter returns to the calling routine (see FIG. 4) at 595.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

storing a first set of keystrokes received from an input method editor (IME) into the memory;

comparing a second set of keystrokes received from the IME against the first set of keystrokes stored in the memory;

in response to the second set of keystrokes not matching the first set of keystrokes:

determining that the first set of keystrokes is not a password; and replacing the first set of keystrokes with the second set of keystrokes in the memory; and in response to the second set of keystrokes matching the first set of keystrokes:

determining that the second set of keystrokes is a possible new password being established by a user to access a first resource;

converting the second set of keystrokes to a new hash value;

comparing the new hash value against one or more current hash values, wherein the one or more current hash values were generated from one or more current passwords established by the user to access one or more second resources, wherein the first resource is different from the one or more second resources; and notifying the user in response to the comparing revealing that at least one of the one or more current hash values matches the first new hash value.

2. The method of claim 1 further comprising:

storing the possible new password with the one or more current passwords in response to the comparing failing to identify at least one of the one or more current hash values matching the new hash value.

3. The method of claim 1 wherein the identifying further comprises:

identifying a password length phrase of the second set of keystrokes in response to determining that the second set of keystrokes matches the first set of keystrokes; and comparing the password length phrase to a dictionary and revealing that the password length phrase does not match any dictionary words and that at least one character in the password length phrase is selected from the group consisting of a special character and a numeric character.

4. The method of claim 1 wherein the identifying further comprises:

comparing the second set of keystrokes to a received set of password security rules, wherein the possible new password complies with the set of password security rules and is received twice in succession at the IME.

5. The method of claim 1 wherein the notifying inhibits display of the possible new password.

6. An information handling system comprising:

one or more processors;

a memory coupled to at least one of the processors; and a set of computer program instructions stored in the memory and executed by at least one of the processors in order to perform actions comprising:

storing a first set of keystrokes received from an input method editor (IME) into the memory;

comparing a second set of keystrokes received from the IME against the first set of keystrokes stored in the memory;

in response to the second set of keystrokes not matching the first set of keystrokes:

determining that the first set of keystrokes is not a password; and replacing the first set of keystrokes with the second set of keystrokes in the memory; and in response to the second set of keystrokes matching the first set of keystrokes:

determining that the second set of keystrokes is a possible new password being established by a user to access a first resource;

converting the second set of keystrokes to a new hash value;

comparing the new hash value against one or more current hash values, wherein the one or more current hash values were generated from one or more current passwords established by the user to access one or more second resources, wherein the first resource is different from the one or more second resources; and notifying the user in response to the comparing revealing that at least one of the one or more current hash values matches the new hash value.

7. The information handling system of claim 6 wherein the actions further comprise:

storing the possible new password with the one or more current passwords in response to the comparing failing to identify at least one of the one or more current hash values matching the new hash value.

8. The information handling system of claim 6 wherein the identifying further comprises:

identifying a password length phrase of the second set of keystrokes in response to determining that the second set of keystrokes matches the first set of keystrokes; and comparing the password length phrase to a dictionary and revealing that the password length phrase does not match any dictionary words and that at least one character in the password length phrase is selected from the group consisting of a special character and a numeric character.

9. The information handling system of claim 6 wherein the identifying further comprises:

comparing the second set of keystrokes to a received set of password security rules, wherein the possible new password complies with the set of password security rules and is received twice in succession at the IME.

10. The information handling system of claim 6 wherein the notifying inhibits display of the possible new password.

11. A computer program product stored in a non-transitory computer readable storage medium, comprising computer program code that, when executed by an information handling system, performs actions comprising:

storing a first set of keystrokes received from an input method editor (IME) into a memory;

comparing a second set of keystrokes received from the IME against the first set of keystrokes stored in the memory;

in response to the second set of keystrokes not matching the first set of keystrokes:

determining that the first set of keystrokes is not a password; and replacing the first set of keystrokes with the second set of keystrokes in the memory; and in response to the second set of keystrokes matching the first set of keystrokes:

determining that the second set of keystrokes is a possible new password being established by a user to access a first resource;

converting the second set of keystrokes to a new hash value;

comparing the new hash value against one or more current hash values, wherein the one or more current hash values were generated from one or more current passwords established by the user to access one or more second resources, wherein the first resource is different from the one or more second resources; and notifying the user in response to the comparing revealing that at least one of the one or more current hash values matches the new hash value.

12. The computer program product of claim 11 wherein the actions further comprise:

storing the possible new password with the one or more current passwords in response to the comparing failing to identify at least one of the one or more current hash values matching the new hash value.

13. The computer program product of claim 11 wherein the identifying further comprises:

identifying a password length phrase of the second set of keystrokes in response to determining that the second set of keystrokes matches the first set of keystrokes; and comparing the password length phrase to a dictionary and revealing that the password length phrase does not match any dictionary words and that at least one character in the password length phrase is selected from the group consisting of a special character and a numeric character.

14. The computer program product of claim 11 wherein the identifying further comprises:

comparing the second set of keystrokes to a received set of password security rules, wherein the possible new password complies with the set of password security rules and is received twice in succession at the IME.

* * * * *